United States Patent
Itkin

(10) Patent No.: US 11,346,921 B2
(45) Date of Patent: May 31, 2022

(54) HIDDEN RECEPTION MONITORING DURING A SIGNAL RECEPTION OPERATION

(71) Applicant: Infineon Technologies AG, Neubiberg (DE)

(72) Inventor: Grigory Itkin, Munich (DE)

(73) Assignee: Infineon Technologies AG

( * ) Notice: Subject to any disclaimer, the term of this patent is extended or adjusted under 35 U.S.C. 154(b) by 263 days.

(21) Appl. No.: 16/719,092

(22) Filed: Dec. 18, 2019

(65) Prior Publication Data

US 2021/0190910 A1    Jun. 24, 2021

(51) Int. Cl.
  *G01S 7/40* (2006.01)
  *G01S 7/35* (2006.01)

(52) U.S. Cl.
  CPC ............ *G01S 7/4021* (2013.01); *G01S 7/352* (2013.01); *G01S 7/40* (2013.01); *G01S 7/356* (2021.05); *G01S 7/358* (2021.05)

(58) Field of Classification Search
  CPC ........ G01S 13/343; G01S 13/87; G01S 7/352; G01S 7/356; G01S 7/358; G01S 7/40; G01S 7/4021
  See application file for complete search history.

(56) References Cited

U.S. PATENT DOCUMENTS

| | | | |
|---|---|---|---|
| 10,097,287 B1 | 10/2018 | Schat et al. | |
| 2006/0148434 A1* | 7/2006 | Miyagi | H04B 1/28 455/142 |
| 2015/0362584 A1 | 12/2015 | Jenkins et al. | |
| 2017/0031005 A1* | 2/2017 | Jaeger | G01S 7/4021 |
| 2018/0038943 A1 | 2/2018 | Ramasubramanian et al. | |
| 2018/0175946 A1* | 6/2018 | Cheng | H04B 17/12 |
| 2019/0072647 A1* | 3/2019 | Schat | G01S 7/354 |
| 2019/0146059 A1 | 5/2019 | Zanati et al. | |
| 2019/0242973 A1 | 8/2019 | Schat et al. | |

* cited by examiner

*Primary Examiner* — Timothy X Pham
(74) *Attorney, Agent, or Firm* — Design IP

(57) ABSTRACT

A radio frequency circuit includes an input terminal configured to receive a reception signal from an antenna; a reception signal path coupled to the input terminal and including a mixer and an analog-to-digital converter (ADC), where the ADC generates a digital signal representing an input signal to the ADC; a test signal generator configured to generate a test signal that is injected into the reception signal path while the reception signal propagates along the reception signal path; a digital signal processor configured to receive the digital signal from a digital portion of the reception signal path, and analyze a frequency response of the digital signal; and a subtractor coupled to the digital portion of the reception signal path, the subtractor configured to remove test frequency components resulting from an injection of the test signal into the reception signal path from the digital signal.

23 Claims, 4 Drawing Sheets

HIDDEN RECEPTION MONITORING DURING A SIGNAL RECEPTION OPERATION

FIELD

The present disclosure relates to the field of signal monitoring, and particularly to reception monitoring of a reception signal path of a radio frequency (RF) circuit.

BACKGROUND

Modern radar devices such as radar range and velocity sensors can be integrated in so-called monolithic microwave integrated circuits (MMICs). Radar sensors may be applied, for example, in the automotive sector, where they are used in so-called advanced driver assistance systems (ADAS) such as, for example, "adaptive cruise control" (ACC) or "radar cruise control" systems. Such systems may be used to automatically adjust the speed of an automobile so as to maintain a safe distance from other automobiles travelling ahead. However, RF circuits are also used in many other fields such as RF communication systems.

A radar MMIC (sometimes referred to as single chip radar) may incorporate all core functions of the RF frontend of a radar transceiver (e.g., local oscillator, power amplifiers, low-noise amplifiers (LNA), mixers, etc.), the analog pre-processing of the intermediate frequency (IF) or base band signals (e.g., filters, amplifiers, etc.), and the analog-to-digital conversion in one single package. The RF frontend usually includes multiple reception and transmission channels, particularly in applications in which beam steering techniques, phased antenna arrays, etc. are used. In radar applications, phased antenna arrays may be employed to sense the incidence angle of incoming RF radar signals (also referred to as "Direction of Arrival", DOA).

Reception (RX) monitoring is an operation executed by a radar MMIC to ensure that all units involved in reception of radar signal are working as expected and the received radar data can be trusted for use. RX monitoring is currently executed outside (i.e., before, after, or between) of receiving regular radar operation frames and takes several milliseconds to complete, during which regular radar operation is not operable. In other words, RX monitoring is performed while a receiver of the radar MMIC does not receive radar signals (i.e., radar echoes). This additional time blocked for RX monitoring is undesirable because of it requires additional current consumption, it induces temperature increases in the radar MMIC heating, and it excludes regular radar operations from being performed, which results in gaps in receiving radar data. Furthermore, minimization of time allocated for RX monitoring results in degradation of its accuracy. Thus, simply minimizing the time blocked for RX monitoring is not a viable solution.

In view of the above, an improved radar MMIC that performs RX monitoring simultaneously with regular radar operation during which radar data is received may be desirable.

SUMMARY

Embodiments provide a method for and a device for reception monitoring of a reception signal path of a radio frequency (RF) circuit.

One or more embodiments provide a radio frequency (RF) circuit, including: an input terminal configured to receive a reception signal; an output terminal configured to output a digital output signal; a reception signal path coupled to and between the input terminal and the output terminal, wherein the reception signal path includes analog portion and a digital portion; a local oscillator configured to generate a reference signal; an IQ modulator configured to receive the reference signal and generate a first test signal that has a constant frequency offset from the reference signal; a directional coupler configured to couple the first test signal into the analog portion of the reception signal path; a mixer configured to receive the first test signal coupled into the reception signal path and the reference signal from the local oscillator, and generate a first mixer output signal having a first test frequency equal to the constant frequency offset; a multi-frequency signal generator configured to generate a multi-tone test signal including a plurality of second test frequencies; a first combiner configured to combine at least the multi-tone test signal and the first mixer output signal to generate a combined signal; a front end signal processing circuit including an analog-to-digital converter (ADC) configured to convert the combined signal into a digital signal; a digital signal processor (DSP) configured to receive the digital signal from the digital portion of the reception signal path, and analyze a frequency response of the digital signal; and a cancelation circuit configured to generate a combined digital test signal, wherein the combined digital test signal includes test frequency components corresponding to the first test frequency and the plurality of second test frequencies, wherein the cancelation circuit includes a subtractor coupled to the digital portion of the reception signal path, the subtractor configured to remove the test frequency components from the digital signal based on the combined digital test signal to generate the digital output signal.

One or more embodiments provide a method of performing reception monitoring in a RF circuit. The method includes generating a reference signal; generating a first test signal that has a constant frequency offset from the reference signal; injecting the first test signal into an analog portion of a reception signal path; generating a first mixer output signal based on the first test signal, coupled into the reception signal path, and the reference signal, wherein the first mixer output signal has a first test frequency equal to the constant frequency offset; generating a multi-tone test signal including a plurality of second test frequencies; combining at least the multi-tone test signal and the first mixer output signal to generate a combined signal; converting the combined signal into a digital signal; analyzing a frequency response of the digital signal; generating a combined digital test signal, wherein the combined digital test signal includes test frequency components corresponding to the first test frequency and the plurality of second test frequencies; and removing the test frequency components from the digital signal based on the combined digital test signal to generate a digital output signal.

One or more embodiments provide a method of performing reception monitoring in an RF circuit during an RF operation cycle. The method includes receiving a reception signal that propagates along a reception signal path; generating a reference signal; generating, by a mixer, a mixer output signal based on the reception signal and the reference signal; generating a digital signal based on the mixer output signal; analyzing the frequency response of the digital signal; generating a first test signal that has a constant frequency offset from the reference signal based on the analyzed frequency response; generating a multi-tone test signal including a plurality of test frequencies based on the analyzed frequency response; injecting the first test signal into the reception signal path upstream from the mixer; and injecting the multi-tone test signal into the reception signal path downstream from the mixer.

One or more embodiments provide a radio frequency (RF) circuit, including: an input terminal configured to receive a reception signal from an antenna; an output terminal configured to output a digital output signal; a reception signal path including a mixer and an analog-to-digital converter (ADC), wherein the reception single path is coupled to and between the input terminal and the output terminal and wherein the ADC generates a digital signal representing an input signal to the analog-to-digital converter; a test signal generator configured to generate a test signal and inject the test signal into the reception signal path while the reception signal propagates along the reception signal path; a digital signal processor (DSP) configured to receive the digital signal from the digital portion of the reception signal path, and analyze a frequency response of the digital signal; and a subtractor coupled to the ADC, the subtractor configured to remove test frequency components resulting from an injection of the test signal into the reception signal path from the digital signal.

BRIEF DESCRIPTION OF THE DRAWINGS

Embodiments are described herein making reference to the appended drawings.

DETAILED DESCRIPTION

Figure 1:
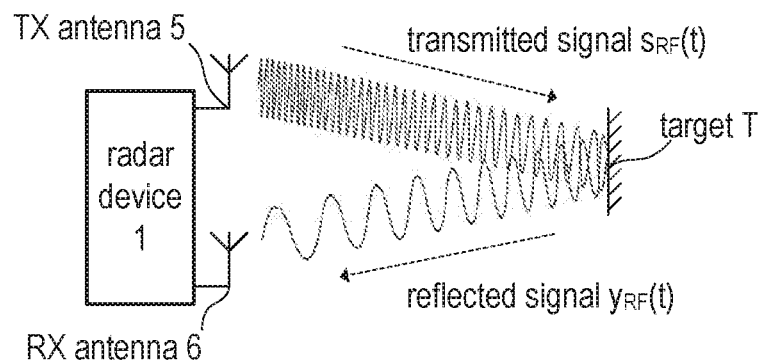
FIG. 1 is a drawing illustrating the operating principle of a frequency-modulated continuous-wave (FMCW) radar system for distance and/or velocity measurement.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation, and/or any other processes required to make a sensor output suitable for processing after conditioning.

Thus, a signal processing circuit may include analog circuity and/or digital circuitry including an analog-to-digital converter (ADC) that converts the analog signal from the one or more sensor elements to a digital signal. The signal processing circuit may include a digital signal processor (DSP) that performs some processing on the digital signal.

Embodiments are discussed below in the context of a radar transmitter or transceiver. It should be noted, however, that the described embodiments may also be applied in applications different from radar such as, for example, RF transceivers of RF communication devices.

FIG. 1 illustrates a frequency-modulated continuous-wave (FMCW) radar system 1. In the present example, separate transmission (TX) and reception (RX) antennas 5 and 6, respectively, are used. However, it is noted that a single antenna can be used so that the transmission antenna and the reception antenna are physically the same (monostatic radar configuration). It will be appreciated that "(t)" denotes an analog signal defined as a continuous wave that may change over a time period t, and "(k)" denotes a digital signal defined as a discrete wave, where k is an integer and may represent a kth digital sample or a digital signal containing k digital samples. A signal may be represented with or without its analog or digital domain identifier (t) and (k), respectively.

The transmission antenna continuously radiates an RF signal $S_{RF}(t)$, which is frequency-modulated, for example, by a periodic linear frequency ramp signal (also referred to as frequency sweep or chirp signal). The transmitted signal $S_{RF}(t)$ is back-scattered at a target T, which is located in the radar channel within the measurement range of the radar device. The back-scattered signal $y_{RF}(t)$ is received by the reception antenna 6. In the depicted example, the back-scattered signal is denoted as $y_{RF}(t)$.

Figure 2:
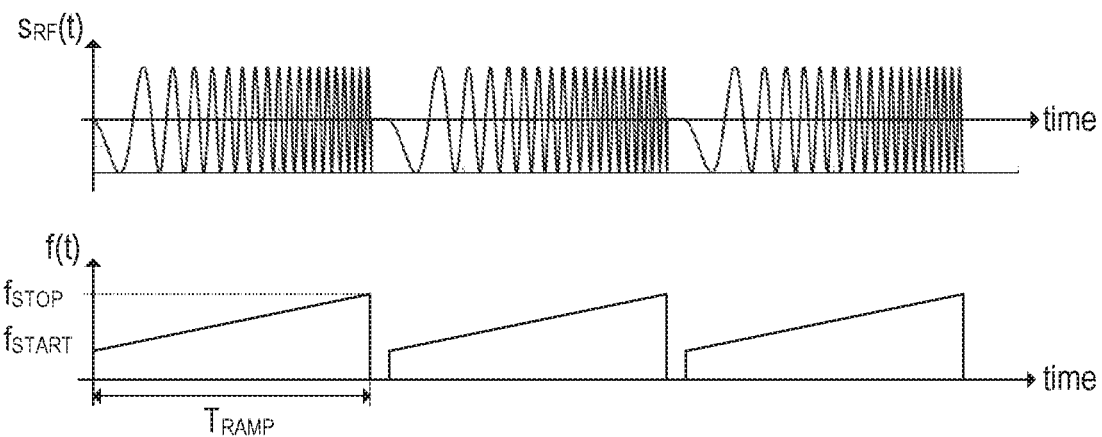
FIG. 2 includes two timing diagrams illustrating the frequency modulation of the radio frequency (RF) signal used in FMCW radar systems.

FIG. 2 illustrates the mentioned frequency-modulation of the signal $S_{RF}(t)$ according to one or more embodiments. As shown in FIG. 2, the signal $S_{RF}(t)$ may be composed of a series of "chirps", that is to say the signal sRF(t) comprises a sequence of sinusoidal signal profiles (waveforms) with rising frequency (up-chirp) or falling frequency (down-chirp). In the present example, the instantaneous frequency f(t) of a chirp increases linearly, starting at a start frequency fSTART to a stop frequency fSTOP within a time interval TRAMP. Such chirps are also referred to as linear frequency ramps. A plurality of ramps may make up a radar frame which may also be referred to as a radar operation cycle. For examples, a radar operation cycle may include several hundreds of radar ramps (sweeps) taking up to 10-30 ms in total. A frame length of the radar frame corresponds to one radar operation cycle. It is also to be noted that consecutive ramps have a short pause therebetween and a longer pause may be used between consecutive radar frames.

It will be appreciated that the start frequency $f_{START}$ and stop frequency $f_{STOP}$ of the ramps may be within a frequency band with minimum frequency Fmin and maximum frequency Fmax. As such, frequency Fmin and frequency Fmax define an operating frequency range or the frequency band usable for the ramping signals, and, thus, the frequency range or the frequency band of the radar application of the radar MMIC. In some embodiments, the frequency range defined by a single ramp having start and stop frequencies $f_{START}$ and $f_{STOP}$ may be smaller than the usable frequency band. However, all ramps that are generated during operation lie between the frequencies Fmin and Fmax of the radar band used for generating the ramping signals.

TFIG. 2 illustrates three identical linear frequency ramps. It is noted, however, that the parameters $f_{START}$, $f_{STOP}$, $T_{RAMP}$ as well as the pause between the individual frequency ramps may vary dependent on the actual implementation and use of the radar device 1. In practice, the frequency variation may be, for example, linear (linear ramp, frequency ramp), exponential (exponential ramp), or hyperbolic (hyperbolic ramp). In some embodiments, the frequency may decrease instead of increase during time $T_{RAMP}$. Furthermore, in other embodiments the center frequency of each ramp (and therefore $f_{START}$ and $f_{STOP}$) may vary (e.g. from ramp to ramp or after detecting an interference) to allow using the full or a part of the frequency band. In one example, the frequency band has a minimum frequency Fmin of 76 GHz and a maximum frequency Fmax of 81 GHz.

Figure 3:
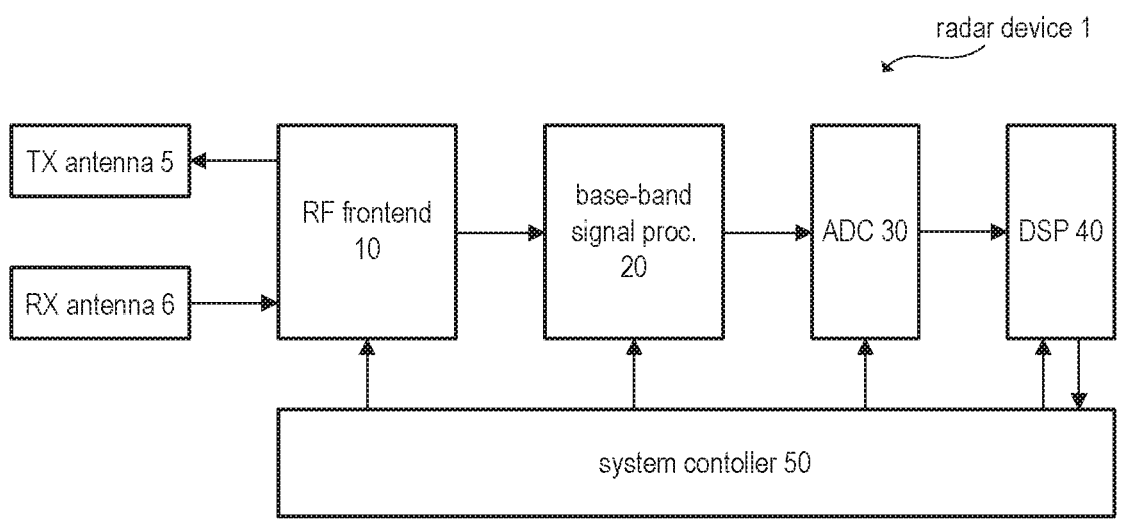
FIG. 3 is a block diagram illustrating the basic structure of an FMCW radar device.

FIG. 3 is a block diagram that illustrates an exemplary structure of a radar device 1 (radar sensor). It is noted that a similar structure may also be found in RF transceivers used in other applications such as, for example, in wireless communications systems. Accordingly, at least one transmission antenna 5 (TX antenna) and at least one reception antenna 6 (RX antenna) are connected to an RF frontend 10, which may be integrated in a monolithic microwave integrated circuit (MMIC).

The RF frontend 10 may include all the circuit components needed for RF signal processing. Such circuit components may (but need not necessarily) include, for example, a local oscillator (LO), RF power amplifiers, low noise amplifiers (LNAs), directional couplers such as rat-race-couplers and circulators, and mixers for the down-conversion of RF signals (e.g., the received signal $y_{RF}(t)$, see FIG. 1) into the base-band or an intermediate frequency (IF) band.

It is noted that antenna-arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several transmission (TX) and reception (RX) channels, which among others allows the measurement of the direction (direction of arrival (DoA)), from which the radar echoes are received.

In the case of a frequency-modulated continuous-wave (FMCW) radar system, the transmitted RF signals radiated by the TX antenna 5 are in the range between approximately 20 GHz and 100 GHz (e.g. in the frequency band 21 to 26 GHz or in the frequency band 76 to 81 GHz). As mentioned, the RF signal $y_{RF}(t)$ received by the RX antenna 6 includes the radar echoes, i.e., the signal back-scattered at the so-called radar targets.

The received RF signals $y_{RF}(t)$ are down-converted into the base band (or the IF band) and further processed in the base band using analog signal processing (see FIG. 3, base band signal processing chain 20), which basically includes filtering and amplification of the base-band signal. It will be appreciated that if the received RF signals are down-converted into the IF band, the base band signal processing chain 20 may be referred to as an IF signal processing chain. Thus, the analog base band signal processing chain 20, in general, may also be referred to as an analog signal processing chain 20.

The base-band signal is finally digitized using one or more analog-to-digital converters (ADC) 30 and further processed in the digital domain (see FIG. 3, digital signal processing chain implemented, e.g., in digital signal processor, DSP, 40). The RF frontend 10 and the analog base band signal processing chain 20 (and optionally the ADC 30) may be integrated in a single MMIC. However, in some applications, some components may also be distributed among two or more integrated circuits.

The overall system is controlled by a system controller 50, which may be at least partly implemented using a processor, such as a microcontroller executing appropriate firmware.

Figure 4:
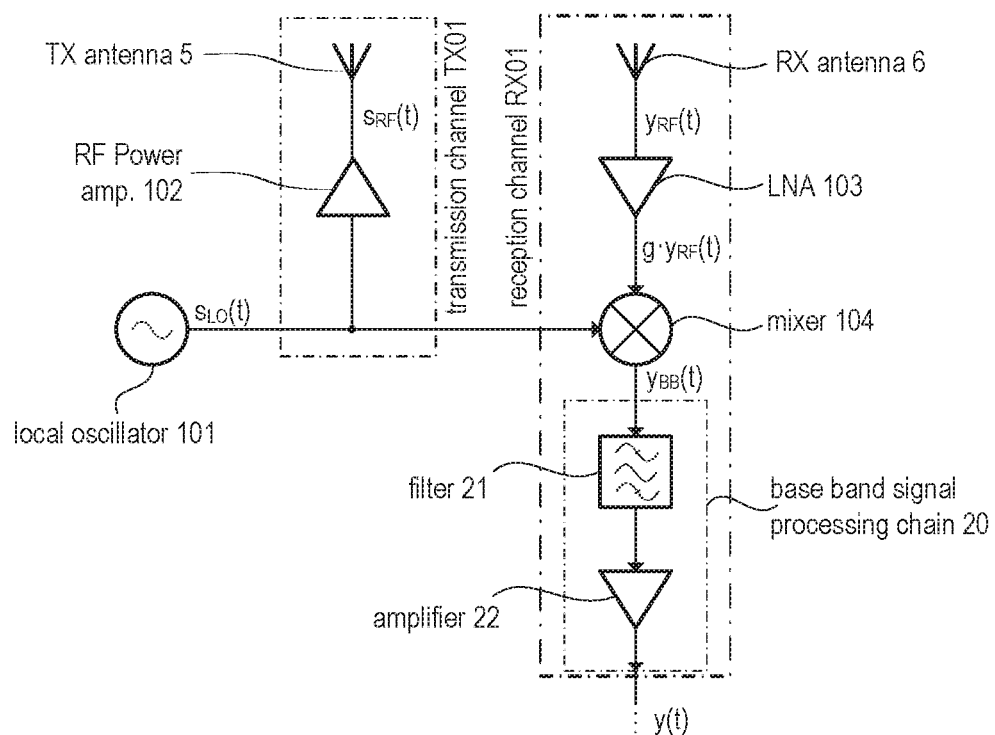
FIG. 4 is a circuit diagram illustrating one example of an analog RF frontend, which may be included in the FMCW radar device of FIG. 3.

FIG. 4 illustrates one exemplary implementation of the RF frontend 10, which may be included in the radar sensor shown in FIG. 3. It is noted that FIG. 4 is a simplified circuit diagram illustrating the basic structure of the RF frontend. Actual implementations, which may heavily depend on the application, are of course more complex and include several RX and/or TX channels. The RF frontend 10 includes a local oscillator (LO) 101 that generates an RF signal $S_{LO}(t)$, which may be frequency-modulated as explained above with reference to FIG. 2. The RF signal $S_{LO}(t)$ is also referred to as LO signal or a reference signal. In radar applications, the LO signal is usually in the SHF (Super High Frequency) or the EHF (Extremely High Frequency) band, e.g., between 76 GHz and 81 GHz in automotive applications. The LO signal may also be generated at a lower frequency and then up-converted using frequency multiplication units.

The LO signal $S_{LO}(t)$ is processed in the transmission signal path as well as in the reception signal path. The transmission signal $S_{RF}(t)$ (outgoing radar signal), which is radiated by the TX antenna 5, is generated by amplifying the LO signal $S_{LO}(t)$, e.g., using an RF power amplifier 102. The output of the amplifier 102 is coupled to the TX antenna 5. The received signal $y_{RF}(t)$ (incoming radar signal), which is provided by the RX antenna 6, is directed to a mixer 104, which may be an LNA mixer. In the present example, the received signal $y_{RF}(t)$ (i.e., the antenna signal) is pre-amplified by RF amplifier 103 (gain g), so that the mixer receives the amplified signal $g \cdot y_{RF}(t)$ at its RF input port.

The mixer 104 further receives the LO signal $S_{LO}(t)$ at its reference input port and is configured to down-convert the amplified signal $g \cdot y_{RF}(t)$ into the base band or into the IF band. In this case, it is converted into the base band and the resulting base-band signal at the mixer output is denoted as $y_{BB}(t)$. The base-band signal $y_{BB}(t)$ is further processed by the analog base band signal processing chain 20 (see also FIG. 3), which basically includes one or more filters (e.g., a band-pass 21) to remove undesired side bands and image frequencies as well as one or more amplifiers such as amplifier 22). The analog output signal, which may be supplied to an analog-to-digital converter (cf. FIG. 3), is denoted as y(t). Various techniques for the digital post-processing of the digitized output signals (digital radar signal) are as such known (e.g., Range Doppler Analysis) and thus not further explained herein.

In the present example, the mixer 104 down-converts the RF signal $g \cdot y_{RF}(t)$ (amplified antenna signal) into the base band. The respective base band signal (mixer output signal) is denoted by $y_{BB}(t)$. The down-conversion may be accomplished in a single stage (i.e., from the RF band into the base band) or via one or more intermediate stages (from the RF band into an IF band and subsequently into the base band). In view of the example of FIG. 4, it is clear that the quality of the radar measurement will heavily depend on the quality of the LO signal $S_{LO}(t)$. Low phase noise, as well as steep and highly linear frequency ramps are desired properties of the LO signal $S_{LO}(t)$.

Embodiments relate generally to RX monitoring of a reception signal path of a radar circuit (e.g., a radar MMIC), and more particularly to performing RX monitoring simultaneously with regular radar operations during which radar data is received by a receiver of the radar circuit. In addition, the RX monitoring should be hidden. As a result of the hidden RX monitoring, the RX monitoring should not be detectible to any kind of signals coming though RX antenna, nor should the RX monitoring modify or disturb the output RX data of the radar circuit. Thus, components external to the radar circuit, such as an external DSP 40, should not be able to detect that the RX monitoring took place in the normal course of processing radar data output from the radar circuit. As such, RX monitoring is hidden behind regular radar operations, which not only eliminates blocking time during which regular radar operations are excluded but also increases accuracy of RX Monitoring and as a result the accuracy of the overall system.

Figure 5:
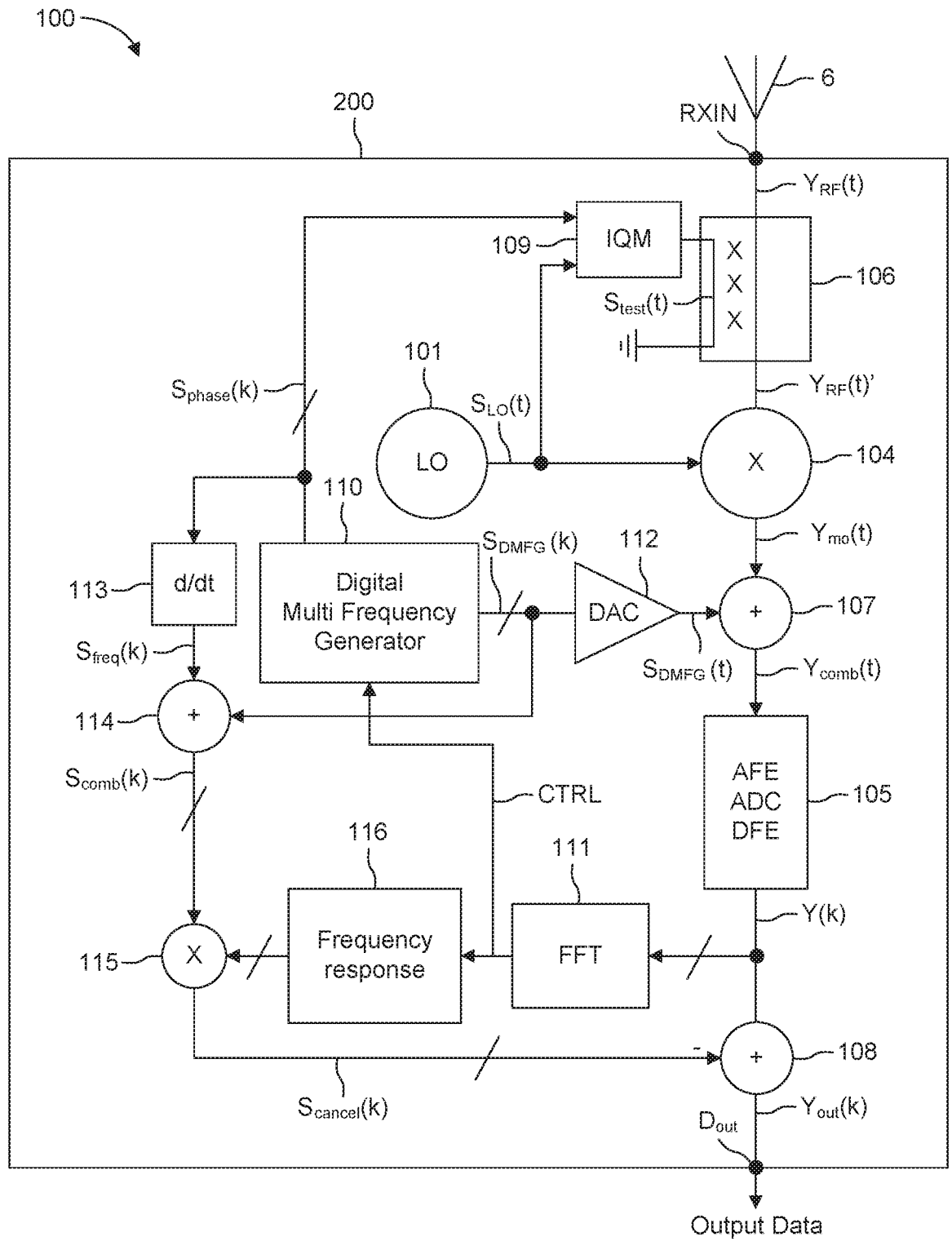
FIG. 5 is a schematic block diagram of a radar circuit according to one or more embodiments.

FIG. 5 shows a schematic block diagram of a radar circuit 100 according to one or more embodiments. The radar circuit 100 comprises an RX antenna 6 and a radar MMIC 200 coupled to the RX antenna 6. The radar MMIC comprises the RF frontend 10, the analog signal processing chain 20, and the ADC 30 shown in FIG. 3. The output (i.e., output data) of the radar circuit 100 is provided to DSP 40 (see FIG. 2) for processing of received radar data via digital data output terminal DOUT.

The RX antenna 6 is configured to receive RF signal $y_{RF}(t)$ (i.e., an incoming radar signal), as described above.

The radar MMIC 200 includes the local oscillator 101 that generates a LO signal $S_{LO}(t)$, as described above. The radar MMIC 200 also includes mixer 104, to which the LO signal $S_{LO}(t)$ is transmitted by the local oscillator 101. The mixer 104 is configured to receive the RF signal $y_{RF}(t)'$, which may be pre-amplified by RF amplifier 103 (see FIG. 4), and the LO signal $S_{LO}(t)$, and is further configured to down-convert the RF signal $y_{RF}(t)$ or the amplified signal $g \cdot y_{RF}(t)$ into a down-converted signal using the LO signal $S_{LO}(t)$.

RF signal $y_{RF}(t)'$ is used to denote one of the possible signals received by the mixer 104, which may include the RF signal $y_{RF}(t)$, the amplified signal $g \cdot y_{RF}(t)$, and/or the test signal $S_{Test}(t)$ having been injected by directional coupler 106 into the RF part of the reception signal path between the reception input terminal RX IN and the mixer 104. In other words, there may be instances in which a test signal $S_{Test}(t)$ is or is not injected into the RF part of the reception signal path. When the test signal $S_{Test}(t)$ is injected into the reception signal path, the test signal $S_{Test}(t)$ co-exists with the RF signal $y_{RF}(t)$. Thus, RF signal $y_{RF}(t)'$ is intended to represent both of those situations since the principal operation of the mixer 104 is independent of the signals being input thereto.

The mixer 104 generates a mixer output signal $y_{MO}(t)$ as a down-converted signal, where the mixer output signal $y_{MO}(t)$ is, for example, a down-converted reception signal (e.g., a base band signal or a first IF signal) when a test signal $S_{Test}(t)$ is not injected by the directional coupler 106 or may additionally include a second IF signal when a test signal $S_{Test}(t)$ is injected by the directional coupler 106. In other words, the frequency components included in the RF signal $y_{RF}(t)'$ may change depending on whether or not a test signal $S_{Test}(t)$ is injected by the directional coupler 106, thereby affecting whether the mixer output signal $y_{MO}(t)$ includes an IF signal, attributed to the test signal, or only a down-converted reception signal, attributed to the RF signal $y_{RF}(t)$.

For example, when the RF signal $y_{RF}(t)$ is back-scattered from a radar target (i.e., an object in the environment), the frequency of the RF signal $y_{RF}(t)$ will be offset from the frequency of the LO signal $S_{LO}(t)$. This frequency offset of the RF signal $y_{RF}(t)$ is dependent on the distance from the radar sensor to the radar target and from the velocity of the radar target. Thus, when a radar target exists, the mixer 104 will generate a mixer output signal that has a frequency equal to the frequency offset of the RF signal $y_{RF}(t)$ compared to the frequency of the LO signal $S_{LO}(t)$. This frequency offset is typically not predetermined since the distance to a potential radar target is typically not known beforehand.

In addition, when a test signal $S_{Test}(t)$ is injected by directional coupler 106, the frequencies of the RF signal $y_{RF}(t)'$ and the LO signal $S_{LO}(t)$ are offset from each other by a predetermined frequency offset. The mixer output signal $y_{MO}(t)$ generated by mixer 104 may be a single tone signal that has a single intermediate frequency equal to the difference in frequencies (i.e., equal to the frequency offset). For example, the frequency offset may be 1 MHz, but is not limited thereto as this merely serves as one example. This frequency offset may be referred to as a test offset frequency Foffset.

The mixer output signal $y_{MO}(t)$ is further processed by a front end signal processing circuit 105, that includes an analog front end (AFE) circuit (e.g., analog signal processing chain 20), an ADC, and a digital front end (DFE) circuit that are sequentially arranged along the reception signal path of the radar MMIC 200. The reception signal path of the radar MMIC 200 is an RX signal chain defined by the path between a reception input terminal RX IN and a digital data output terminal DOUT, with the mixer 104 and the front end signal processing circuit 105, as well as a directional coupler 106, an adder (i.e., a combiner element) 107, and a subtractor (i.e., an extractor element) 108, arranged along the reception signal path.

The front end signal processing circuit 105 produces a digital signal y(k) that is digital data (i.e., digital samples) representative of the radar data received in the RF signal $y_{RF}(t)$. The digital signal y(k) is further output from the digital data output terminal DOUT as a digital output signal $y_{out}(k)$, and provided to a DSP that is external to the MMIC 200 (e.g., DSP 40).

For performing RX monitoring, the MMIC 200 additionally includes an IQ modulator (IQM) 109, a digital multi-frequency generator (DMFG) 110, a DSP 111 that includes a fast Fourier transform (FFT) module or any other module implementing frequency analysis of input data, a digital-to-analog converter (DAC) 112, a digital differentiator 113, a digital adder 114, a digital multiplier 115, and a frequency response module 116. The frequency response module 116 may be integrated as part of the DSP 111, but is shown as a separate unit for the purposes of explanation. The DSP 111 may be a controller with capabilities of generating and analyzing a frequency response of a digital signal.

RX monitoring is performed in parallel with data reception (i.e., in parallel with receiving the RF signal $y_{RF}(t)$) and includes injecting two signals into two different RF parts of the reception signal path. In particular, a test signal STest(t) is injected into a first RF part of the reception signal path, upstream from mixer 104, and an analog multi-frequency (multi-tone) signal SDMFG(t) is injected into a second RF part of the reception signal path, downstream from mixer 104.

The test signal STest(t) is generated by an IQ modulator (IQM) 109 and is coupled into the reception signal path by the directional coupler 106, which transmits the test signal STest(t) towards the mixer 104. The analog multi-tone signal SDMFG(t) is derived from a digital multi-tone signal SDMFG(k) generated by the DMFG 110.

The two injected signals are used to verify that the components along the reception signal path are working as expected, for example, with enough gain and SNR, the correct filtering is being applied, the correct matching to other RX channels, etc.

The DMFG 110 may be realized in the digital or the analog domain. Here, it is configured to generate a digital multi-frequency (multi-tone) signal SDMFG(k) based on a plurality of selected (test) frequencies. The DMFG 110 transmits the multi-tone signal SDMFG(k) to the DAC 112, which converts the multi-tone signal SDMFG(k) into an analog version SDMFG(t). The multi-tone signal SDMFG(k), and hence the multi-tone signal SDMFG(t), includes a set of low frequency components for testing the AFE, the ADC, and the DFE in the front end signal processing circuit 105 at different frequencies, in parallel.

The DAC 112 then transmits the multi-tone signal SDMFG(t) to an adder 107 that is configured to inject the multi-tone signal SDMFG(t) into the second RF part of the reception signal path.

The DMFG 110 is further configured to generate a digital phase control signal Sphase(k). The phase control signal Sphase(k) is a periodic signal that provides a constantly changing phase value that is linearly shifted continuously from 0°-360°. The DMFG 110 may also set the speed at which the phase of the phase control signal Sphase(k) is rotated.

The IQ modulator (IQM) 109 is configured to generate the test signal STest(t) and transmit the test signal STest(t) to the directional coupler 106 to be injected into the reception signal path while the RF signal $y_{RF}(t)$ is being received. In particular, the IQM 109 is configured to receive the LO signal SLO(t) as a reference signal and phase information (e.g., a current phase value) from the phase control signal Sphase(k), and generate the test signal STest(t) based on the two input signals.

Specifically, the IQM 109 is configured to constantly rotate the phase of the received LO signal SLO(t) over time using the phase information in order to maintain a constant frequency difference equal to the test offset frequency Foffset between the test signal STest(t) and the LO signal SLO(t) received by the mixer 104. In other words, since the LO signal SLO(t) is a periodic ramping signal, its frequency is constantly changing according to the frequency ramps.

In order to maintain a constant frequency difference between the test signal STest(t) and the LO signal SLO(t), the IQM 109 is configured to constantly change the phase of the received LO signal SLO(t) in a linear manner to produce the test signal STest(t). As a result, the frequency of the test signal STest(t) is constantly shifted in step with the LO signal SLO(t) in order to maintain the constant frequency difference equal to the test offset frequency Foffset. Thus, the frequency of the test signal STest(t) is a ramping signal that varies from fSTART+Foffset to fSTOP+Foffset or fSTART−Foffset to fSTOP−Foffset.

The RX monitoring includes at least a first stage and a second stage. During the first stage of the RX monitoring, no test signals are injected into the reception signal path and the frequency response module 116 may be deactivated. Instead, during a first portion of a radar operation cycle, the digital signal y(k), corresponding solely to the RF signal $y_{RF}(t)$, is observed by DPS 111 to determine whether the result of an FFT analysis includes any potential radar targets (e.g., spikes) or detectable distortions on frequencies selected for monitoring the reception signal path. A signal that has a power level that is less than the thermal noise level is not detectable because it is below the noise floor. Thus, a detectable distortion or a detectable component refers to one that has a power level above the noise floor.

The selected frequencies include the test offset frequency Foffset as well as any additional frequencies generated by the DMFG 110. As one non-limiting example, the selected frequencies may include 100 kHz, 300 kHz, 500 kHz, 1 MHz, 3 MHz, 5 MHz, and 10 MHz, or any frequencies therebetween.

The DSP 111 applies an FFT to the digital signal y(k), and analyzes the frequency response of the digital signal y(k) over different predefined frequency windows W1-W5 spread across a predefined frequency range. Each predefined frequency window includes a different one of the selected frequencies. The DSP 111 analyses the frequency response in each predefined frequency window to check if there are any potential radar targets or detectable distortions on the selected frequencies. That is, whether one or more of the selected (test) frequencies conflicts with the received RF signal $y_{RF}(t)$.

In the case that no potential radar targets or detectable distortions are detected by the DSP 111, no changes are made to the selected frequencies and the test sequence may proceed to a second stage, during which the test signals STest(t) and multi-tone signal SDMFG(t) are injected into the reception signal path and the frequency response module 116 is activated in order to output the frequency response to multiplier 115.

In the case that potential radar targets or detectable distortions are detected by the DSP 111, the DSP 111 generates a control signal CRTL that includes configuration information used by the DMFG to change one or more of its selected frequencies. For example, the DMFG 110 is configured to receive information from the DSP 111 indicating that at least one conflict exists with at least one of the selected frequencies. The information may indicate at which frequency window or windows at least one potential radar target or distortion is detected.

In response to this information, the DMFG 110 is configured to select a different frequency for each of its selected frequencies that correspond to a conflicted frequency window. In the event a conflicted frequency window corresponds to the test offset frequency Foffset, the test offset frequency Foffset induced by the IQM 109 may also be changed by adapting the phase control signal $S_{phase}(k)$ to provide a different test offset frequency Foffset, which results is a different test frequency produced by the mixer 104.

As a result, exact test frequencies used for RX monitoring selected by the DMFG 110 can be shifted to another sub-area free of potential targets or detectable distortions prior to testing. Doing so ensures that the test signals STest(t) and SDMFG(t) do not obscure a portion of the RF signal $y_{RF}(t)$ that corresponds to a potential radar target and ensures that the test signals STest(t) and SDMFG(t) are not influenced by any distortion in the RF signal $y_{RF}(t)$ that could impact test results. A test frequency, resultant from either the IQM 109 or the DMFG 110, may be shifted within its own predetermined or assigned frequency window or may be shifted outside its predetermined or assigned frequency window. In either case, the sub-area to which the test frequency is shifted should be free from potential radar targets or detected distortions.

Once the DMFG 110 determines that all test frequencies are shifted to sub-areas free of potential targets or detectable distortions, the test sequence may proceed to the second stage, during which the test signals STest(t) and multi-tone signal SDMFG(t) are injected into the reception signal path and the frequency response module 116 is activated in order to output the frequency response to multiplier 115.

Alternatively, the DMFG 110 may be configured to skip generating the selected frequency corresponding to a conflicted frequency window rather than shifting the selected frequency to a different sub-area. Thus, the DMFG 110, for example, may generate a multi-tone signal SDMFG(k) for the second stage that comprises only of frequencies that do not correspond to a conflicted frequency window. In other words, the DMFG 110 removes one or more selected frequencies from the multi-tone signal SDMFG(k) that may have a conflict with the RF signal $y_{RF}(t)$. Additionally, or alternatively, the IQM modulator 109 may be configured such that its test signal is not generated.

Alternatively, if suitable sub-areas free from potential radar targets and detected distortions cannot be found, stage two may be skipped entirely for the radar frame. In this case, the test procedure may start anew at the first stage for the next radar frame.

Figure 6:
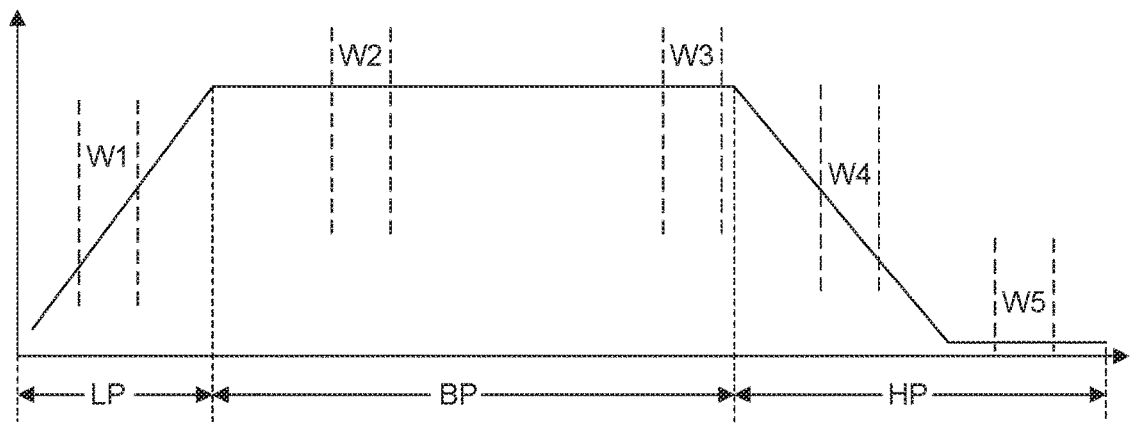
FIG. 6 illustrates an RX frequency response of an RF signal along with different frequency measurement windows allocated over different parts of the RX frequency response according to one or more embodiments.

FIG. 6 illustrates an RX frequency response of RF signal $y_{RF}(t)'$ along with different frequency measurement windows allocated over different parts (i.e., sub-areas) of the RX frequency response according to one or more embodiments. The RX frequency response, generated by the DSP 111, provides frequency characteristics of the reception signal path. The RX frequency response includes three ranges, includes a low-pass frequency range LP, a band-pass frequency range BP, and a high-pass frequency range HP. The RX frequency response is generated by the DSP 111, which then performs the frequency window analysis according to a plurality of predefined frequency windows W1, W2, W3, W4, and W5. Each of the plurality of predefined frequency windows W1-W5 represents a different frequency range that includes (i.e., overlaps with) one of the selected frequencies.

A width of a frequency window may be, for example, 100 Hz up to 50 KHz, which is the inverse to the length of time used for the first stage. However, it will be appreciated that the width of the frequency windows is not limited to this range and may vary according to the length of time used for the first stage and/or the number of frequency windows used.

As noted above, the selected frequencies include the test offset frequency Foffset as well as any additional frequencies generated by the DMFG 110. The plurality of predefined frequency windows W1-W5 are spread over the frequency range of the IF frequency range of radar system.

Figure 7:
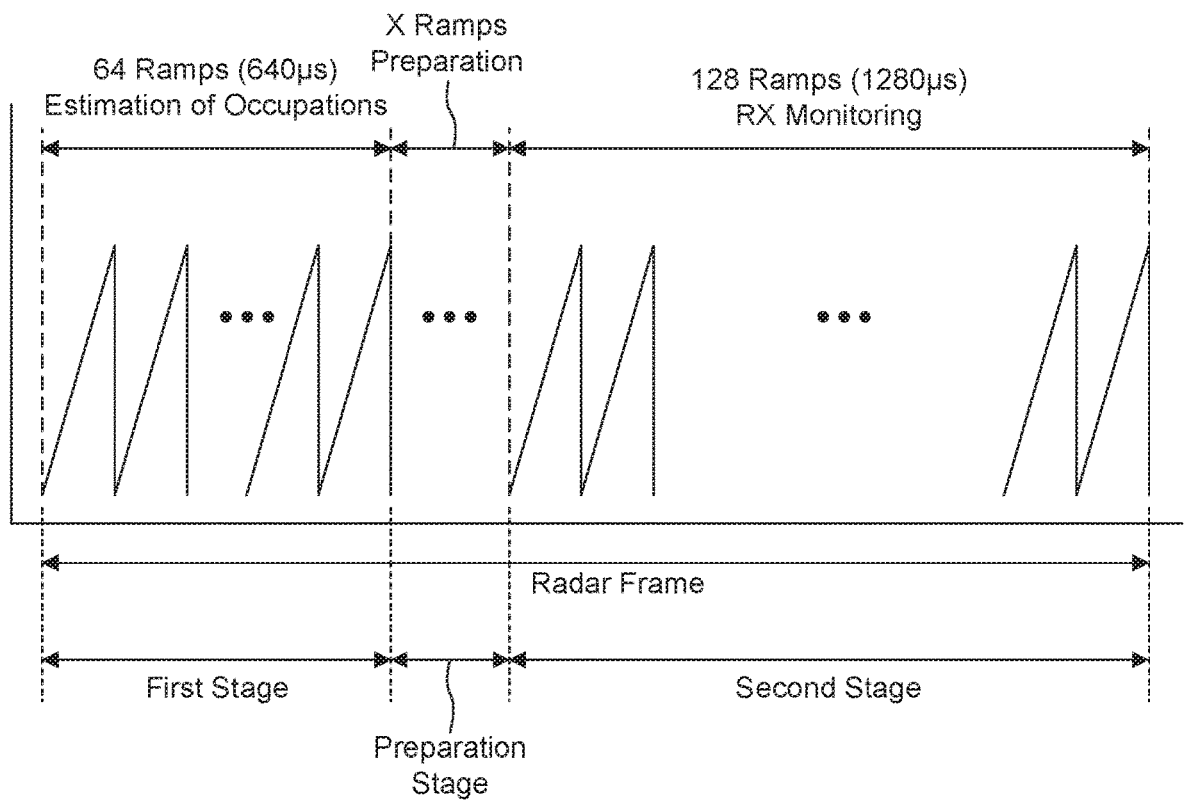
FIG. 7 illustrates a radar operation cycle separated into at least two stages for RX monitoring according to one or more embodiments.

FIG. 7 illustrates a radar operation cycle separated into at least two stages for RX monitoring according to one or more embodiments. Since a radar operation cycle corresponds to a reception of a radar frame (i.e., a frame length of the radar frame corresponds to one radar operation cycle), it can be seen that the RX monitoring is performed in parallel with the reception of a radar frame during the radar operation cycle. The at least two stages include the first stage described herein, during which a first part of the radar operation cycle (i.e., the radar frame) is observed to verify that predefined frequency windows (e.g., predefined frequency windows W1-W5) are free from potential radar targets and detectable distortions.

If a conflicted frequency window is detected, the DMFG 110 is configured to either shift selected frequencies that correspond to one or more conflicted frequency windows into a "clear" sub-area, or skip generating a selected frequency corresponding to a conflicted frequency window, as described herein. Thus, the DMFG 110 may use a preparation stage that takes place over X ramps between the first stage and the second stage to prepare the multi-tone signal SDMFG(k), including determining which selected frequencies to use for the multi-tone signal SDMFG(k) based on the first stage observation. Here, X is a predefined integer.

The DMFG 110 makes this determination based on the control signal CTRL provided by the DSP 111. The control signal CTRL may be the frequency response generated by the DSP 111. Accordingly, the DMFG 110 may receive the actual the frequency response to verify whether any selected frequencies are conflicted out and whether the one or more frequencies of the test signal STest(t) and/or the multi-tone signal SDMFG(k)/(t) should be adjusted prior to injection into the reception signal path.

Upon completing the first stage and the preparation stage of the RX monitoring, the MMIC 200 proceeds to a second stage of the RX monitoring, during which the test signals STest(t) and multi-tone signal SDMFG(t) are injected into the reception signal path and the frequency response module 116 is activated in order to output the frequency response to multiplier 115. The second stage takes place during a second part of the radar operation cycle that follows the first part of the radar operation cycle. If an intermediate part of the radar operation cycle during which the preparation stage is used, the second part also follows the intermediate part.

The second stage includes analyzing the frequency response of the injected test signals STest(t) and SDMFG(t) and signal cancelation prior to the digital data output terminal DOUT. The signal cancelation is preformed to ensure that the digital output signal $y_{out}(k)$ is completely free of any component of the injected signals, including test signals STest(t) and multi-tone signal SDMFG(k).

Additionally, it is possible that the first stage, the preparation stage, and the second stage may be repeated multiple times in multiple iterations over the radar operation cycle (i.e., over a single radar frame).

Turning back to FIG. 5, the second stage will be described in further detail. During the second stage, the test signal STest(t) is injected into a first part of the reception signal path as a first test signal and the multi-tone signal SDMFG(t) is injected into a second part of the reception signal path as a second test signal. In particular, the mixer output signal $y_{MO}(t)$ includes a test IF signal that has a frequency equal to the frequency offset Foffset resultant from the frequency difference between the test signal STest(t) and the LO signal $S_{LO}(t)$. The mixer output signal $y_{MO}(t)$ also includes frequency components of the down-converted reception signal resultant from the frequency difference between RF signal $y_{RF}(t)$ and the LO signal $S_{LO}(t)$.

Adder 107 is configured to add the mixer output signal $y_{MO}(t)$ and the multi-tone signal SDMFG(t) to generate a combined signal ycomb(t) that includes frequency components of the down-converted reception signal, the test IF signal, and the multi-tone signal SDMFG(t). The combined signal ycomb(t) passes through the signal path components of the front end signal processing circuit 105, and is output as the digital signal y(k).

The digital signal y(k) is provided to both an input of the DSP 111 and an input of the subtractor 108. The DSP 111 is configured to apply an FFT, or any other method able to create a frequency characteristic of an input signal, to the digital signal y(k) to generate a frequency response thereof and analyze the frequency response. In particular, using the frequency response, the DSP 111 analyzes amplitudes, phases, and/or other parameters of the injected test signals STest(t) and SDMFG(t) at the reception signal path output. In addition, the frequency response module 116 is configured to output the frequency response to the digital multiplier 115 to enable removal of the test signals STest(t) and SDMFG(t) from the digital signal y(k).

Operating in parallel to the reception signal path, the digital differentiator 113 is configured to receive the phase control signal Sphase(k) and extract frequency information from the phase information provided in the phase control signal Sphase(k). As a result, the digital differentiator 113 generates a digital frequency signal Sfreq(k) based on the phase control signal Sphase(k), where the frequency of the frequency signal Sfreq(k) is equal to the frequency of the test signal STest(t). In other words, the differentiator 113 is able to determine the test frequency of the test signal STest(t) from the phase control signal Sphase(k) to enable removal of this frequency component from the digital signal y(k). Thus, the frequency signal Sfreq(k) is a digital representation of the test signal STest(t).

Digital adder 114 is configured to receive frequency signal Sfreq(k) as well as the multi-tone signal $S_{DMFG}(k)$ from the DMFG 110, and adds the two signals in order to generate a combined digital test signal Scomb(k) that includes all selected frequency components, including the test frequency corresponding to the test signal STest(t) as well as any additional test frequencies generated by the DMFG 110. The preparation of a frequency response may take some time. Therefore, it may be possible to use the frequency response generated during previous monitoring cycle or even during factory calibration.

Digital adder 114 provides the combined digital test signal Scomb(k) to the digital multiplier 115, where it is multiplied (in digital form) with the frequency response of the reception signal path received from frequency response module 116 in order to generate a cancelation signal Scancel(k). The digital multiplier 115 provides the cancelation signal Scancel(k) to the subtractor 108, which removes the cancelation signal Scancel(k) from the digital signal y(k) in a way that output data is free from any injected testing components. Thus, the subtractor 108 generates the digital output signal $y_{out}(k)$ based on this subtraction. In this way, RX monitoring is performed in a hidden mode during regular radar operation, since the injected testing components are not detectable by the DSP 40. The hidden RX Monitoring cleans injected "spurs" from the digital signal y(k) and is therefore non-distorting for RX output data.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized, and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A radio frequency (RF) circuit, comprising:
   an input terminal configured to receive a reception signal;
   an output terminal configured to output a digital output signal;
   a reception signal path coupled to and between the input terminal and the output terminal, wherein the reception signal path includes analog portion and a digital portion;
   a local oscillator configured to generate a reference signal;
   an IQ modulator configured to receive the reference signal and generate a first test signal that has a constant frequency offset from the reference signal;
   a directional coupler configured to couple the first test signal into the analog portion of the reception signal path;
   a mixer configured to receive the first test signal coupled into the reception signal path and the reference signal from the local oscillator, and generate a first mixer output signal having a first test frequency equal to the constant frequency offset;
   a multi-frequency signal generator configured to generate a multi-tone test signal comprising a plurality of second test frequencies;
   a first combiner configured to combine at least the multi-tone test signal and the first mixer output signal to generate a combined signal;
   a front end signal processing circuit comprising an analog-to-digital converter (ADC) configured to convert the combined signal into a digital signal;
   a digital signal processor (DSP) configured to receive the digital signal from the digital portion of the reception signal path, and analyze a frequency response of the digital signal; and
   a cancelation circuit configured to generate a combined digital test signal, wherein the combined digital test signal comprises test frequency components corresponding to the first test frequency and the plurality of second test frequencies, wherein the cancelation circuit comprises a subtractor coupled to the digital portion of the reception signal path, the subtractor configured to remove the test frequency components from the digital signal based on the combined digital test signal to generate the digital output signal.

2. The RF circuit of claim 1, wherein:
   the reception signal is a first periodic ramping signal, the reference signal is a second periodic ramping signal, and the first test signal is a third periodic ramping signal.

3. The RF circuit of claim 1, wherein:
   the IQ modulator is configured to generate the first test signal while the reception signal propagates along the reception signal path,
   the directional coupler is configured to couple the first test signal into the analog portion of the reception signal path while the reception signal propagates along the reception signal path,
   the multi-frequency signal generator is configured to generate the multi-tone test signal while the reception signal propagates along the reception signal path, and
   the first combiner is configured to generate the combined signal that includes frequency components corresponding to the reception signal.

4. The RF circuit of claim 3, wherein the digital output signal comprises the frequency components corresponding to the reception signal and is free from detectable components of the test frequency components.

5. The RF circuit of claim 1, wherein:
   the multi-frequency signal generator is configured to generate a phase control signal that includes a linearly changing phase value, and
   the IQ modulator is configured to receive the phase control signal and generate the first test signal based on the linearly changing phase value.

6. The RF circuit of claim 5, wherein:
   the reception signal is a first periodic ramping signal, the reference signal is a second periodic ramping signal, and the first test signal is a third periodic ramping signal, and
   the IQ modulator is configured to continuously rotate a phase of the reference signal based on the linearly changing phase value in order to generate the first test signal such that the first test signal has the constant frequency offset from the reference signal.

7. The RF circuit of claim 1, wherein:
   the first combiner is configured to generate the combined signal that includes frequency components corresponding to the reception signal, and
   the cancelation circuit further comprises:
   a second combiner configured to receive a first signal having the first test frequency and a second signal comprising the plurality of second test frequencies, and combine the first signal and the second signal to generate the combined digital test signal; and
   a multiplier configured to multiply the combined digital test signal with the frequency response to generate a cancellation signal, wherein the subtractor is configured to receive the digital signal and the cancellation signal, and subtract the cancellation signal from the digital signal to generate the digital output signal.

8. The RF circuit of claim 7, wherein:
the multi-frequency signal generator is configured to generate a phase control signal that includes a linearly changing phase value,
the IQ modulator is configured to receive the phase control signal and generate the first test signal based on the linearly changing phase value, and
the cancelation circuit further comprises:
a differentiator configured to receive the phase control signal, extract the first test frequency from the phase control signal based on the linearly changing phase value, generate the first signal having the first test frequency extracted from the phase control signal, and provide the first signal to the second combiner.

9. The RF circuit of claim 1, wherein the input terminal is configured to receive the reception signal during a radar operation cycle, the reception signal comprises a radar frame having a frame length corresponding to a total duration of the radar operation cycle.

10. The RF circuit of claim 9, wherein:
the radar operation cycle comprises a first stage of a first duration and a second stage of a second duration, wherein the second stage is subsequent to the first stage,
during the first stage, the IQ modulator and the multi-frequency signal generator are deactivated, and
during the second stage, the IQ modulator and the multi-frequency signal generator are activated to generate the first test signal and the multi-tone test signal, respectively, the mixer is configured to generate the first mixer output signal, and the first combiner is configured to generate the combined signal.

11. The RF circuit of claim 10, wherein, during the first stage:
the mixer is configured to generate a second mixer output signal based on the reception signal and the reference signal,
the front end signal processing circuit is configured to generate a first stage digital signal based on the second mixer output signal, and
the DSP is configured to receive the first stage digital signal from the digital portion of the reception signal path, and analyze a first stage frequency response of the first stage digital signal.

12. The RF circuit of claim 11, wherein:
the multi-frequency signal generator is configured to control the constant frequency offset, and
during the first stage:
the DSP is configured with a plurality of predefined frequency windows, each corresponding with a different one of the first test frequency and the plurality of second test frequencies,
the DSP is configured to analyze the first stage frequency response and determine whether at least one potential radar target or at least one distortion is detected within any of the plurality of predefined frequency windows,
on a condition that the at least one potential radar target or the at least one distortion is detected within one of the plurality of predefined frequency windows that corresponds to the first test frequency, the DSP is configured to control the multi-frequency signal generator to shift the constant frequency offset to a different constant frequency offset, resulting in the first test frequency being shifted, and
on a condition that the at least one potential radar target or the at least one distortion is detected within any of the plurality of predefined frequency windows that correspond to the plurality of second test frequencies, the DSP is configured to control the multi-frequency signal generator to shift at least one of the plurality of second test frequencies to at least one different test frequency, wherein each of the at least one of the plurality of second test frequencies corresponds to one of the plurality of predefined frequency windows in which the at least one potential radar target or the at least one distortion is detected.

13. The RF circuit of claim 12, wherein:
the first stage is completed and the second stage is started on a condition that the plurality of predefined frequency windows are free from any potential radar target and any distortion.

14. The RF circuit of claim 12, wherein:
the first stage is completed and the second stage is started in response to the multi-frequency signal generator shifting at least one of the constant frequency offset to a different constant frequency offset or the at least one of the plurality of second test frequencies to the at least one different test frequency.

15. The RF circuit of claim 12, wherein each of the first test frequency and the at least one of the plurality of second test frequencies to be shifted are shifted within a corresponding one of the plurality of predefined frequency windows.

16. A method of performing reception monitoring in a RF circuit, the method comprising:
generating a reference signal;
generating a first test signal that has a constant frequency offset from the reference signal;
injecting the first test signal into an analog portion of a reception signal path;
generating a first mixer output signal based on the first test signal, coupled into the reception signal path, and the reference signal, wherein the first mixer output signal has a first test frequency equal to the constant frequency offset;
generating a multi-tone test signal comprising a plurality of second test frequencies;
combining at least the multi-tone test signal and the first mixer output signal to generate a combined signal;
converting the combined signal into a digital signal;
analyzing a frequency response of the digital signal;
generating a combined digital test signal, wherein the combined digital test signal comprises test frequency components corresponding to the first test frequency and the plurality of second test frequencies; and
removing the test frequency components from the digital signal based on the combined digital test signal to generate a digital output signal.

17. The method of claim 16, wherein:
the reference signal and the first test signals are periodic ramping signals.

18. The method of claim 16, further comprising:
receiving a reception signal that propagates along the reception signal path, wherein
the first test signal is generated while the reception signal propagates through the reception signal path,
the first test signal is injected into the analog portion of the reception signal path while the reception signal propagates along the reception signal path, the multi-tone test signal is generated while the reception signal propagates along the reception signal path, and the combined signal includes frequency components corresponding to the reception signal.

19. The method of claim 18, wherein the digital output signal comprises the frequency components corresponding to the reception signal and is free from detectable components of the test frequency components.

20. The method of claim 16, further comprising:
generating a phase control signal that includes a linearly changing phase value,
wherein generating the first test signal includes generating the first test signal based on the linearly changing phase value.

21. The method of claim 20, further comprising:
receiving a reception signal that propagates along the reception signal path, wherein the reception signal is a first periodic ramping signal, the reference signal is a second periodic ramping signal, and the first test signal is a third periodic ramping signal; and
continuously rotating a phase of the reference signal based on the linearly changing phase value in order to generate the first test signal such that the first test signal has the constant frequency offset from the reference signal.

22. The method of claim 16, further comprising:
receiving a reception signal that propagates along the reception signal path, wherein the combined signal includes frequency components corresponding to the reception signal;
combining a first signal and a second signal to generate the combined digital test signal, wherein the first signal has the first test frequency and the second signal comprises the plurality of second test frequencies;
multiplying the combined digital test signal with the frequency response to generate a cancellation signal; and
subtracting the cancellation signal from the digital signal to generate the digital output signal.

23. The method of claim 22, further comprising:
generating a phase control signal that includes a linearly changing phase value;
generating the first test signal based on the linearly changing phase value;
extracting the first test frequency from the phase control signal based on the linearly changing phase value; and
generating the first signal having the first test frequency extracted from the phase control signal.

* * * * *